United States Patent [19]

Yoshimoto et al.

[11] Patent Number: 5,172,364
[45] Date of Patent: Dec. 15, 1992

[54] MAGNETO-OPTIC RECORDING APPARATUS WITH CONTROLLED MAGNETIC FIELD GENERATION

[75] Inventors: Kyosuke Yoshimoto; Osamu Ito; Kunimaro Tanaka; Koichi Takeuchi; Isao Watanabe; Kazuhiko Tsutsumi, all of Amagasaki, Japan

[73] Assignee: Mitsubishi Denki Kabushiki Kaisha, Japan

[21] Appl. No.: 558,584

[22] Filed: Jul. 26, 1990

[30] Foreign Application Priority Data

Aug. 1, 1989 [JP] Japan ................................. 1-200538
Oct. 17, 1989 [JP] Japan ................................. 1-270979
Nov. 21, 1989 [JP] Japan ................................. 1-304273
Nov. 21, 1989 [JP] Japan ................................. 1-304277

[51] Int. Cl.$^5$ .............................................. G11B 7/00
[52] U.S. Cl. ..................................... 369/100; 369/13; 360/114
[58] Field of Search .................. 369/13, 14, 100, 116, 369/112; 360/114, 59; 365/122

[56] References Cited

U.S. PATENT DOCUMENTS 4,825,428  4/1989  Toki ..................... 369/13
4,862,437  8/1989  Okada ................... 369/13
4,878,132 10/1989  Aratani et al. ......... 360/59

OTHER PUBLICATIONS

"Recording Power Characteristics of 130 mm Overwritable MO Disk by Laser Power Modulation Method", Proc. Int. Symp. on Optical Memory 1989, Japanese Journal of Applied Physics, vol. 28 (1989) supplement 28-3, pp.367-370.

Primary Examiner—Tommy P. Chin
Assistant Examiner—Robert Chevalier
Attorney, Agent, or Firm—Wolf, Greenfield & Sacks

[57] ABSTRACT

A magneto-optic recording apparatus which has a magnetic field generator that applies a magnetic field with a constant direction to a magneto-optic recording information medium for overwriting information to improve accuracy of recording and reproducing information onto and from magneto-optic recording information medium and further has an auxiliary magnetic field generator that compensates a variation of intensity of a magnetic field generated by the magnetic field generator and applied to the magneto-optic recording information medium is disclosed as the first invention. Also, a magneto-optic recording apparatus which performs synchronous wave detection of the reflected light signals from the magneto-optic recording information medium and controls A.C. voltages applied to an exciting coil of the magnetic field generator in response to the detected result of the synchronous wave detection, thus optimizing amplitudes of the reproducing signals from the magneto-optic recording information medium is disclosed as the second invention.

13 Claims, 17 Drawing Sheets

Fig. 16
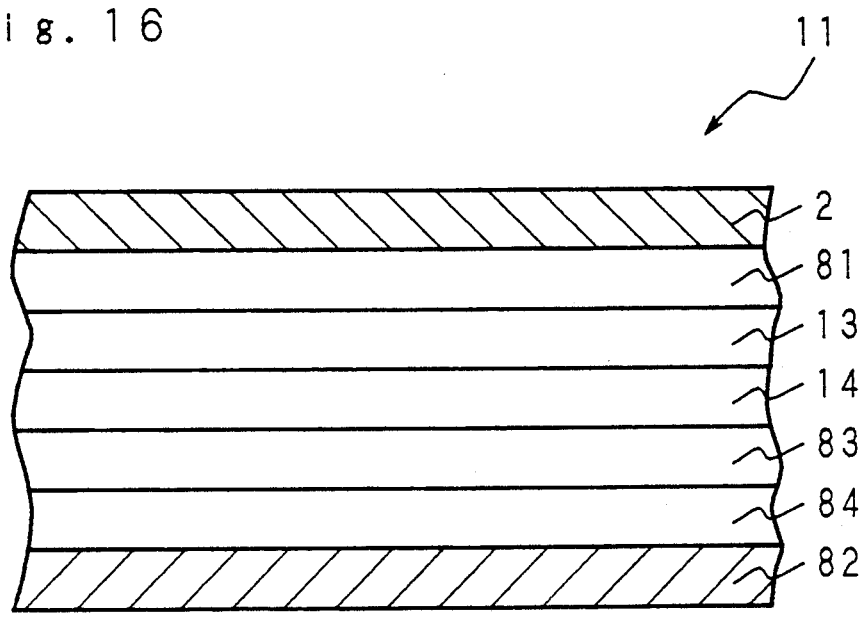
Fig. 17(a)    Fig. 17(b)
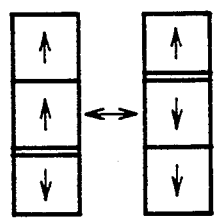 OR 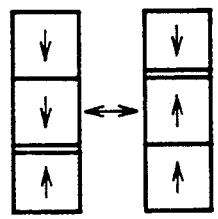     i-1th LAYER
                                                   i th LAYER
                                                   i+1th LAYER

MAGNETO-OPTIC RECORDING APPARATUS WITH CONTROLLED MAGNETIC FIELD GENERATION

BACKGROUND OF THE INVENTION

1. Field of the Invention

This invention relates to an information recording apparatus for a magneto-optic recording information medium (magneto-optic disk), and more particularly, to the same for magneto-optic recording information medium having a so-called light modulation overwriting function which enables writing of new information directly over old recorded information.

2. Description of Related Art

A magneto-optic recording information medium, namely, a magneto-optic disk having a light modulation overwriting function, and a magneto-optic recording apparatus were proposed in the Japanese Patent Application Laid-Open No. 1-119244 (1989).

The proposed magneto-optic recording information medium included a first magnetic layer having vertical magnetic anisotropy and a second magnetic layer, which also has vertical magnetic anisotropy, laid on the first magnetic layer and is bonded to it with exchange force. The medium is characterized in that the second magnetic layer (a) does not cause flux reversal and keeps its direction of magnetization constant at recording and producing, (b) meets the requirement of $Tc_1 < Tc_2$
where
$Tc_1$ is the Curie temperature of the first magnetic layer,
$Tc_2$ is the Curie temperature of the second magnetic layer and (c) meets the requirements of $$Hc_1 > Hw_1 + Hb, \; Hc_2 > Hw_2 + Hb$$

at room temperatures,
where
$Hc_1$ is the coercive force of the first magnetic layer
$Hc_2$ is the coercive force of the second magnetic layer
$Hw_1$ is the shift quantity of inversion magnetic field due to the exchange force of the first magnetic layer
$Hw_2$ is the shift quantity of inversion magnetic field due to exchange force of the second magnetic layer
$Hb$ : applied magnetic field at recording ($Hb > 0$).

"The proposed magneto-optic recording apparatus included a magneto-optic recording information medium having at least two magnetic layers with vertical magnetic anisotropy, one layer of which keeps its direction of magnetization constant and does not cause flux reversal at recording and reproducing, a beam emitting element which projects a beam on the magneto-optic recording information medium to record or reproduce information, and a magnetic field generator which generates a magnetic field to be applied to a portion of the magneto-optic recording information medium projected by the beam emitting element while keeping the direction of magnetic field constant.

Now, referring to an drawings, the explanation of this medium and apparatus will be given in more detail as follows.

FIG. 1(a) is a schematic diagram showing an outline of a magneto-optic recording information medium and the essential part of a magneto-optic recording apparatus which records information on the medium as have been proposed in the Japanese Patent Application Laid-Open No. 1-119244 (1989) mentioned above. FIG. 1(b) is a partial section taken along a circumference of the magneto-optic recording information medium and also includes a graph showing the variation of laser beam power for information recording on the magneto-optic recording information medium.

In FIG. 1(a) and (b), numeral 11 denotes a magneto-optic recording information medium, 20, a laser beam from a laser beam emitting element which projects the beam onto the magneto-optic recording information medium 11 to record or reproduce information, and 16, a beam spot which is generated by condensing the laser beam 20 through an objective lens 5 to be projected on the magneto-optic recording information medium 11.

Numeral 18 denotes a magnetic field generator which generates a magnetic field having a constant direction and is applied to a laser beam projected portion on the magneto-optic recording information medium 11.

Numeral 2 denotes a substrate made of glass or plastics.

Numeral 13 denotes a first magnetic layer, which is laminated on the substrate 2 and has vertical magnetic anisotropy.

Numeral 14 denotes a second magnetic layer, which is laminated on the first magnetic layer 13 and has vertical magnetic anisotropy. The second layer 14 is bonded to the first magnetic layer 13 with exchange force and does not cause flux reversal at recording or reproducing, thus keeping the direction of magnetization constant.

Numeral 7 denotes an area with binary data "1" indicating that the direction of magnetization of the first magnetic layer 13 is directed upward in FIG. 1(b).

The first magnetic layer 13 and the second magnetic layer 14 are composed of a rare earth metal-transition metal alloy and have relations $Tc_1 < Tc_2$ (where $Tc_1$ and $Tc_2$ are the Curie temperatures of the first and the second magnetic layers 13 and 14 respectively) and $Hc_1 > Hw_1 + Hb, Hc_2 > Hw_2 + Hb$ (where $Hc_1$ and $Hc_2$ are the coercive forces of the first and the second magnetic layers 13 and 14 at a room temperature, $Hw_1$ and $Hw_2$ are the exchange bonding force of the first and the second magnetic layers 13 and 14 at a room temperature, and $Hb$ is a magnetic field generated by the magnetic field generator.

In order to perform the so-called light modulation direct overwriting, it is necessary to control the intensity of the laser beam 20 from the laser beam emitting element to three levels: high, intermediate and low. At the high and the intermediate levels of the laser pulse beam, in the case when a magnetic layer other than one which does not cause flux reversal is at the high level, either one of a pit (mark) with upward direction of magnetization or a pit with downward direction of magnetization is formed and when at the intermediate level, the other pit is formed. Thus reading of information can be performed with the low level laser beam.

Next, the operation of this apparatus will be described.

The magneto-optic recording information medium 11 is rotated in the direction of an arrow a in the drawing. This medium 11 has two magnetic layers 13 and 14 as described above and is formed with a substrate 2, the first magnetic layer 13 and the second magnetic layer 14 in order from the side of laser projection.

Now, the first magnetic layer 13 is a reading layer as well as a recording layer for holding magnetization orientation indicative of information "0" or "1" and the second magnetic layer 14 is provided to effect overwriting. This second magnetic layer 14 is called an initialization layer and has both the functions of the conventional auxiliary layer and the initialization magnet.

Characteristics of the first magnetic layer 13 and the second magnetic layer 14 are as follows:

Giving notations $Tc_1$ and $Tc_2$ to each Curie temperature of both the layers, then $$Tc_1 < Tc_2.$$

Further, giving notations $Hc_1$ and $Hc_2$ to each coercive force of both the layers, and notations $Hwi$ ($i=1, 2$) to each exchange bonding force of both the layer, then $$Hc_1 > Hw_1 + Hb \quad (1)$$

$$Hc_2 > Hw_2 + Hb \quad (2).$$

Inequality (1) holds within the range of room temperatures to a certain temperature $T_0$ lower than $Tc_1$. That is, in the range from temperature to temperature $T_0$, the coercive force $Hc_1$ of the first magnetic layer 13 is greater than a sum of the effect of the exchange bonding force $Hw_1$ and the applied magnetic field $Hb$ at recording which is generated by the magnetic field generator 18 and is not affected by the direction of magnetization of the second magnetic layer 14 and is able to hold the direction of magnetization indicative of recorded information.

Inequality (2) holds within the whole range of operating conditions. That is, in the whole range of operating conditions, the coercive force $Hc_2$ of the second magnetic layer 14 is greater than a sum of the effect of the exchange bonding force $Hw_2$ and the applied magnetic field $Hb$ at recording which is generated by the magnetic field generator 18. Therefore, once the second magnetic layer 14 is initialized upward as shown in FIG. 1($b$), the direction of magnetization is not reversed and the upward direction of magnetization can be mentioned.

Explanation of reproducing information recorded on the first magnetic layer 13 will now be described.

As shown in FIG. 1($b$), the first magnetic layer is magnetized upward or downward in a thickness corresponding to a binary code "1" or "0". When reproducing information, the beam spot 16 is projected on this first magnetic layer 13 and the direction of magnetization of this projected area of the first magnetic layer 13 is converted into optical information with the well-known optical Kerr effect and thus information recorded in the magneto-optic recording information medium 11 is detected.

In this case, the intensity of the laser projected on the magneto-optic recording information medium 11 is one at point A in a graph of FIG. 3 described later. In the first and the second magnetic layers 13 and 14, the maximum temperature on the beam spot 16 projected by the light beam of this intensity does not reach the respective Curie temperature $Tc_1$, $Tc_2$ of both the layers. Therefore, magnetizing information is not eliminated by beam projection of the beam spot 16.

A relation between temperatures and the inversion magnetic fields of the first magnetic layer 13 is shown in a graph of FIG. 2 and a relation between the intensity of the laser beams on the magneto-optic recording information medium 11 and temperatures of the magnetic layer in the laser spot is shown in the graph of FIG. 3. An inversion magnetic field is the minimum field required to reverse a direction of magnetization and is expressed by $$Hc_1 - Hw_1.$$

When a laser intensity (power) $R_1$ is applied as shown in FIG. 1($b$), a relation between inversion magnetic fields and temperatures of the first magnetic layer is shown in a solid line in FIG. 2 and when a laser intensity (power) $R_0$ is applied, the relation is shown in a broken line.

The operation of recording information "0", that is downward of causing magnetization to be given to the first magnetic layer 13 will now be explained.

When the laser beam 20 with intensity $R_1$ is projected, the temperature of the first magnetic layer 13 in the beam spot 16 rises to $Tr_1$ in FIG 2. Then, when the disk is rotated and the laser beam 20 is not projected on the beam spot 16, the temperature of the first magnetic layer 13 falls. As can be seen from the solid line in FIG. 2, the following inequality is valid within the range of room temperatures to $Tc_1$:

$$|Hb| > Hw_1 - Hc_1$$

Therefore, the direction of magnetization of the first magnetic layer 13 is the direction of the magnetic field generated by the magnetic field generator 18, that is, the direction of a biasing magnetic field $Hb$, namely downward direction.

The operation of recording information "1", that is, of causing an upward direction of magnetization to be given to the first magnetic layer 13 will now be explained.

When the laser beam with its intensity $R_0$ is projected, the temperature of the first magnetic layer 13 in the beam spot 16 rises to $Tr_0$ in FIG. 2. Then, when the disk is rotated and the laser beam 20 is not projected on the beam spot 16, the temperature of the first magnetic layer 13 falls. As can be seen from the broken line in FIG. 2, the following inequality is valid in the vicinity of the temperature $Tp$:

$$|Hb| < Hw_1 - Hc_1.$$

Therefore, the direction of magnetization of the first magnetic layer 13 is the direction in which the exchange force acts, that is, the direction of magnetization of the second magnetic layer 14, namely the upward direction.

Then, when overwriting is performed by the above operation, the laser beam is intensity-modulated to become $R_1$ or $R_0$, that is, the intensity at point C or B in FIG. 3 according to the binary code "0" or "1" of information, thus the overwriting can be effected on old data in real time without requiring magnets for initializing.

The laser intensity at point A in FIG. 3 is the intensity used for reading information as mentioned above. Using this intensity at point A, the maximum temperatures of the first and second magnetic layers 13 and 14 in the beam spot 16 do not reach respective Curie temperature $T_{c1}$ and $T_{c2}$ of both the layers. Therefore, the direction of magnetization, namely, recorded information, is not eliminated by beam projection on the beam spot 16.

Now, the reason why the curve of temperatures of the inversion magnetic fields in the first magnetic layer 13 separates into the broken line curve and the solid one according to the laser intensities $R_0$ or $R_1$ as shown in FIG. 2 will be explained.

Both the magnetic layers 13 and 14 cause the temperature rise due to laser projection, as to heat radiation rate, the first layer 13 has a higher one than that of the second layer 14. The reason is as follows.

(i) Because the laser beam 20 is projected from the side of the first magnetic layer 13, the maximum reachable temperature of the first layer 13 is higher than that of the second layer 14 and thus the heat radiation rate of the first layer 13 is higher than that of the second layer 14.

(ii) The first magnetic layer 13 is adjacent to the substrate 2 and radiates heat through the substrate 2.

(iii) The thickness of the first magnetic layer 13 is very thin, therefore heat radiation is great.

Thus, the heat radiation rate of the first magnetic layer 13 is higher than that of the second magnetic layer 14. Due to the projection of the laser beam 20 with its intensity $R_0$, the temperature of the first magnetic layer 13 rises to $T_{r0}$ in FIG. 2 and after that drops to around $T_p$ in FIG. 2. At this time, the temperature of the second magnetic layer 14 is denoted $T_{2r0}$. Due to the projection of the laser beam 20 with its intensity $R_1$, the temperature of the first magnetic layer 13 rises to $T_{r1}$ in FIG. 2 and thereafter the temperature of the first magnetic layer 13 drops to around $T_p$ in FIG. 2. At this time the temperature of the second magnetic layer 14 is denoted $T_{2r1}$, then due to difference between the heat radiation rates mentioned above, $$T_{2r0} < T_{2r1}$$

results.

That is, when the laser beam 20 with its higher intensity $R_1$ is projected, the temperature of the second magnetic layer 14 becomes higher when the temperature of the layer 13 is about $T_p$. Considering that the exchange bonding force has a tendency to decrease as the temperature of the magnetic layer becomes high, the exchange bonding force becomes small when the laser beam 20 with its higher intensity $R_1$ is projected. Therefore, the difference in FIG. 2 arises between the solid line and the broken line curves of the temperature varying of inversion magnetic fields of the first magnetic layer 13. This causes magnetization hysteresis in relation to temperature and enables overwriting.

EX. 1

The magneto-optic recording information medium 11 is formed by laminating in order ferromagnetic substances, for example, first magnetic layer 13: $Tb_{23}Fe_{72}Co_5$ (thickness 500 Å) and second magnetic layer 14: $Gd_{14}Tb_{14}Co_{72}$ (thickness 1500 Å) on a glass substrate 2 by the sputtering method, for example. The magnetic layers are bonded together by exchange force.

The Curie temperature of the first magnetic layer 13 is about 180° C., and the second magnetic layer 14 has an inversion magnetic field of about 1 k Oe within the range of room temperatures to 250° C. and does not cause flux reversal within the range of operating temperatures. In the first magnetic layer 13, the exchange force becomes greater than the coercive force at about 150° C. The greatest difference between the exchange force and the coercive force is equivalent to a magnetic field of about 1 k Oe.

The magnetic field generator 18 is always producing a magnetic field of about 1 k Oe in a constant direction. The magneto-optic recording information medium 11 is exposed to a magnetic field stronger than the inversion magnetic field of the second magnetic layer 14 and thus the layer 14 is initially once magnetized, for example, upward and uniformly. At this time a direction of a magnetic field generated by the magnetic field generator 18 is upward and the first and the second magnetic layers 13 and 14 have the relation mentioned above.

In the magneto-optic recording information medium 11 thus constituted, due to the above mentioned operations, light modulation direct overwriting can be effected by modulating only a laser beam intensity.

Practically, signals with a linear velocity of 6 m/sec and pit length of 0.8 through 5 μm were light-modulated on the condition that the magnetic field generated by the magnetic field generator 18 is 1000 Oe; laser peak power is 16 mW; bottom power is 5 mW. Then erase ratio more than 25 dB was obtained. Reproducing was performed with laser power of 1.5 mW.

EXS. 2 THROUGH 8

There is no problem when the coercive force of the second magnetic layer 14 is sufficiently large at around the Curie temperature of the first magnetic layer 13, and both the magnetic layers 13 and 14 were laminated on a glass substrate 2 by the sputtering method and thus various types of magneto-optic recording information mediums were obtained as shown in Table 1 in the same as "Ex. 1".

TABLE 1

| Ex. | 1st magnetic layer | | 2nd magnetic layer | |
|---|---|---|---|---|
| 2 | $Tb_{23}Fe_{72}Co_5$ | 500Å | $Gd_{15}Tb_{14}Co_{71}$ | 1500Å |
| 3 | $Tb_{23}Fe_{72}Co_5$ | 400Å | $Gd_{14}Tb_{14}Co_{72}$ | 1500Å |
| 4 | $Tb_{23}Fe_{72}Co_3$ | 400Å | $Gd_{14}Tb_{16}Co_{70}$ | 1500Å |
| 5 | $Tb_{23}Fe_{72}Co_5$ | 500Å | $Gd_{14}Tb_{14}Co_{72}$ | 1800Å |
| 6 | $Tb_{23}Fe_{72}Co_5$ | 400Å | $Gd_{14}Tb_{14}Co_{72}$ | 1800Å |
| 7 | $Tb_{23}Fe_{72}Co_5$ | 500Å | $Tb_{30}Co_{70}$ | 1500Å |
| 8 | $Tb_{23}Fe_{72}Co_5$ | 500Å | $Tb_{33}Co_{65}$ | 1500Å |

Using each magneto-optic recording information medium shown in Table 1 and a linear velocity of 6 m/sec, erase ratios more than 20 dB and 23 through 35 dB at the optimum power were obtained in the same way as "Ex. 1" except that the light modulation was performed as shown in Table 2, and thus the same light modulation direct overwriting as "Ex. 1" could be effected.

TABLE 2

| Ex. | generated magnetic field /Oe | peak power /mW | bottom power /mW |
|---|---|---|---|
| 2 | 1000 ± 100 | 12.0 through 17.0 | 4.0 through 7.0 |
| 3 | 1200 ± 100 | 10.0 through 15.0 | 4.0 through 7.0 |
| 4 | 1300 ± 100 | 11.0 through 17.0 | 4.0 through 7.0 |
| 5 | 1000 ± 100 | 13.0 through 17.0 | 4.5 through 7.5 |
| 6 | 1200 ± 100 | 12.0 through 15.0 | 4.5 through 7.5 |
| 7 | 800 ± 100 | 9.0 through 17.0 | 3.5 through 7.5 |
| 8 | 1200 ± 100 | 12.0 through 17.0 | 4.0 through 8.0 |

EX. 9

As for other types of magneto-optic recording information mediums, ferromagnetic amorphous alloys of transition metals and rare earth metals are suitable. For example, by using compositions and layer thickness of first magnetic layer: $Tb_{23}Fe_{67}Co_{10}$ (thickness 500 Å) and second magnetic layer: $Gd_{12}Tb_{12}Co_{76}$ (thickness 1500 Å)

good overwriting can be effected in the same as "Ex. 1".

Further, each magnetic layer may be formed by the ferromagnetic substances such as DyFeCo, TbCo, TbFe/GdCo, GdDyCo, TbDyCo, DyCo, or other magnetic layers which the first and the second layers 13 and 14 allow to participate in operations only at about room temperatures may be contained in the magneto-optic recording information medium, in this case the second magnetic layer 14 does not cause flux reversal in the operating range. In addition a dielectric layer may be contained in the medium 11 to improve signal quality or to reduce oxidation corrosion of the magnetic layer.

Now, when the above magneto-optic recording information medium is used, it is required to fine control the external magnetic field to improve stability of information recording and quality of reproduced signals as compared with the conventional systems.

That is, although the magnetic field generator 18 is fixed, it is rare for the surface of the magneto-optic recording information medium 11 to be maintained perfect flat and it is inevitable for the surface to have warps. Thus the optical head 22 is so controlled that it can always maintain a constant positional relation to the surface of the magneto-optic recording information medium 11 with servo control. Thus when the magneto-optic recording information medium 11 rotates, the distance between the magneto-optic recording information medium 11 and the optical head 22 or the magnetic field generator 18 varies and this variation is so called an "axial run out".

Now, when the above mentioned axial run out occurs, intensity of the magnetic field at the beam spot 16 on the magneto-optic recording information medium 11 varies owing to variation of the distance between the magneto-optic recording information medium 11 and the magnetic field generator 18.

Thus, it is necessary to more fine control of applying the external magnetic field have improve stability of information recording and quality of reproduced signals as compared with the conventional method.

A relation between the magnetic fields applied to and the reproduced signals from the magneto-optic recording information medium 11 is shown in FIG. 4. In the graph of FIG. 4, an abscissa shows the intensities of the magnetic field applied to the magneto-optic recording information medium 11 and an ordinate the amplitudes of the reproduced signals.

As can be seen from FIG. 4, when the optimum intensity $H_0$ the magnetic field is applied to the magneto-optic recording information medium 11, the reproduced signals having the maximum amplitude are obtained. The amplitude of the reproduced signal gradually decreases as the intensity of the magnetic field shifts from the optium value $H_0$.

In view of this relation between the intensity of the magnetic field applied to the magneto-optic recording information medium 11 and the amplitude of the reproduced signal, application of the external magnetic field requires more fine control as compared with the conventional system.

SUMMARY OF THE INVENTION

This invention is attained in view of such circumstances, and it is a principal object of the invention to provide a magneto-optic recording apparatus which improves the accuracy of information recording and reproducing to and from a magneto-optic recording information medium.

The first embodiment of the invention is a magneto-optic recording apparatus which includes a magnetic field generator which applies a magnetic field with a constant direction to the magneto-optic recording information medium to overwrite information thereon and an auxiliary magnetic field generator which compensates a variation of an intensity of magnetic field applied to the magneto-optic recording information medium. Thus even when a relative distance between the magneto-optic recording information medium and the optical head varies, the optimum magnetic field is applied to the magneto-optic recording information medium.

The second embodiment of the invention is a magneto-optic recording apparatus which includes wave detecting means which performs synchronous wave detection of reflected light signals from the magneto-optic recording information medium and controlling means which controls A.C. voltages applied to an exciting coil of the magnetic field generator in response to a detected result by the wave detecting means. Thus, even when the distance between the magneto-optic recording information medium and the optical head varies, an amplitude of a reproduced signal from the magneto-optic recording information medium is kept optimum.

The above and further objects and features of the invention will more fully be apparent from the following detailed description which should be read in conjunction with accompanying drawings.

BRIEF DESCRIPTION OF THE DRAWINGS

FIG. 16 is a schematic side sectional view showing another embodiment of the magneto-optic recording information medium having four magnetic layers, and FIG. 17 is an illustrative diagram of effective force for explaining states of flux reversal in the magnetic layers.

DESCRIPTION OF THE PREFERRED EMBODIMENTS

Now, this invention will be described in detail referring to the accompanying drawings.

Figure 5:
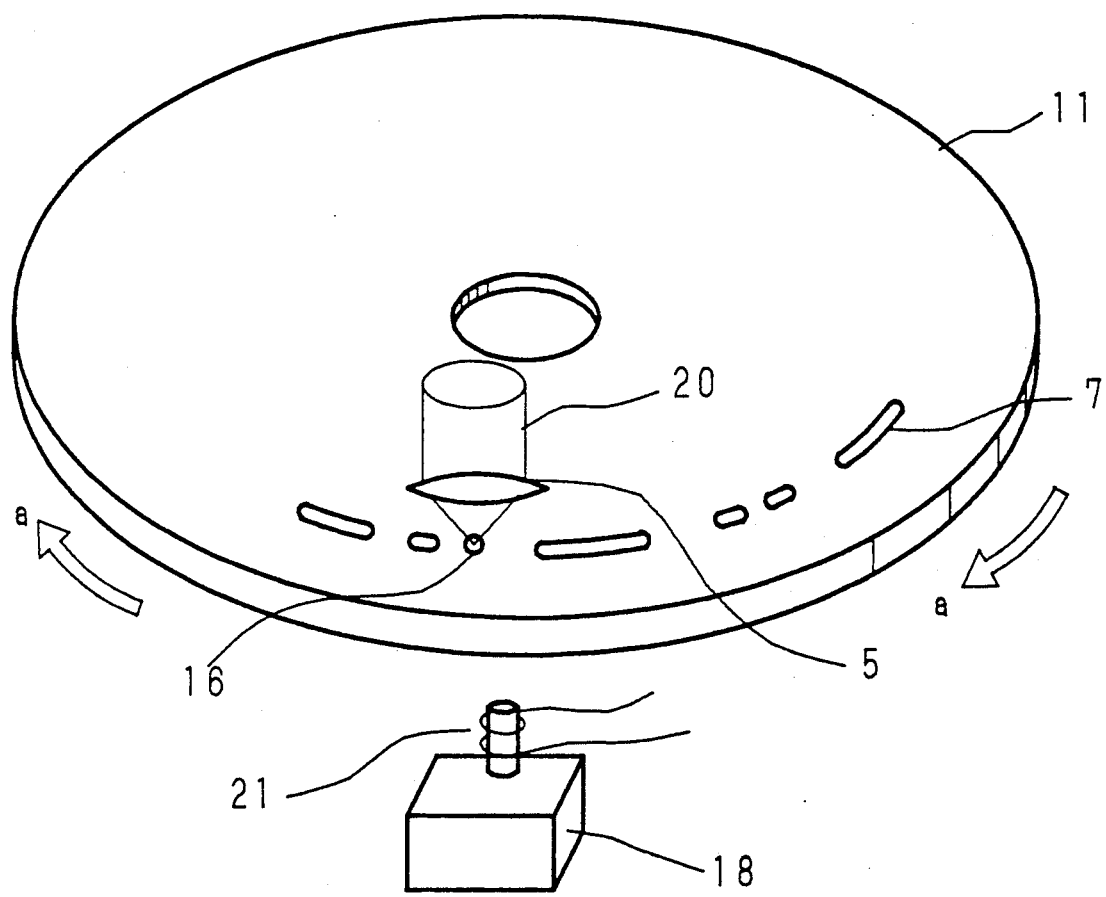
FIG. 5 is a schematic diagram showing an essential part of the magneto-optic recording apparatus along with a magneto-optic recording information medium according to the first invention of the present invention.

FIG. 5 is a schematic diagram showing an essential part of the magneto-optic recording apparatus of the first embodiment of the invention along with the magneto-optic recording information medium 11.

In this figure, numeral 11 denotes the above mentioned magneto-optic recording information medium and it rotates in a direction of an arrow a in the drawing.

Numeral 5 denotes an objective lens, 20 a laser beam, 16 a spot of a laser beam 20 on the magnetic-optic recording information medium 11, 18 a magnetic field generator and a recording apparatus having the same configuration as the conventional magneto-optic recording apparatus.

A difference between the magneto-optic recording apparatus of the invention and the conventional apparatus is that besides the magnetic field generator 18, the apparatus of the invention is provided with an auxiliary magnet 21 using an electromagnet between the magnetic field generator 18 and the magneto-optic recording information medium 11.

Figure 6:
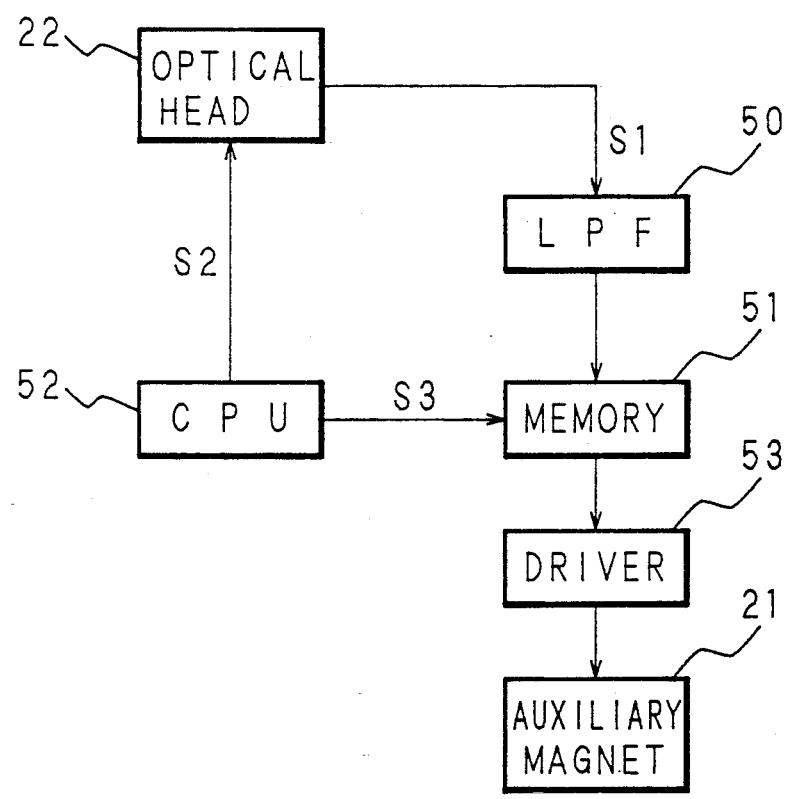
FIG. 6 is a block diagram showing a control circuit for application of a magnetic field.

FIG. 6 is a block diagram showing a control circuit for applying an external magnetic field.

In this figure, numerals 21 and 22 denote the above mentioned auxiliary magnet and the optical head, respectively. A deviation of the distance between the optical head 22 and the magneto-optic recording information medium 11 is detected and this detected signal, that is, an axial run out signal S1 is outputted from the optical head 22. A low frequency component of these axial run out signals S1 are filtered out by a low-pass filter (LPF) 50 to be inputted into a memory 51. On the other hand, a CPU 52 controls position of the optical head 22 in relation to the surface of the magneto-optic recording information medium 11 with a position control signal S2, and this information is given to the memory 51 as a position information signal S3. Therefore, information describing any axial run out on the magneto-optic recording information medium 11 is stored in the memory 51.

The information stored in the memory 51 is given to a driver 53 and the driver 53 actuates the auxiliary magnet 21 based on this information.

FIG. 7(a) through FIG. 7(f) are graphs for explaining operations of the magneto-optic recording apparatus of the invention which comprises the above control circuit for applying the external magnetic field, and graphs (a) and (d) show a relation between rotating positions of the magneto-optic recording information medium 11 and quantities of the axial run out, graphs (b) and (e) show a relation between rotating positions of the magneto-optic recording information medium 11 and applied currents to the auxiliary magnet 21, and graphs (c) and (f) show a relation between rotating positions of the magneto-optic recording information medium 11 and intensities of the magnetic fields applied to the magneto-optic recording information medium 11. Further, graphs (a), (b) and (c) show states of an outer position of the magneto-optic recording information medium 11 and (d), (e) and (f) show states of an inner portion of the magneto-optic recording information medium 11.

Figure 7A:
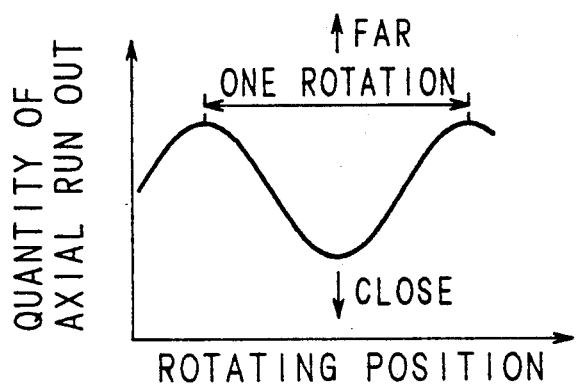
FIG. 7(a) through FIG. 7(f) are graphs for explaining operations of the magneto-optic recording apparatus of the first invention of the present embodiment.
Figure 7B:
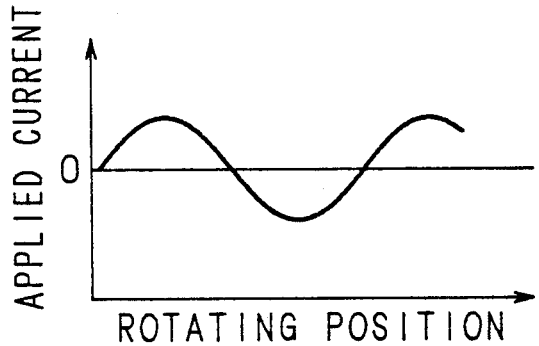
Figure 7C:
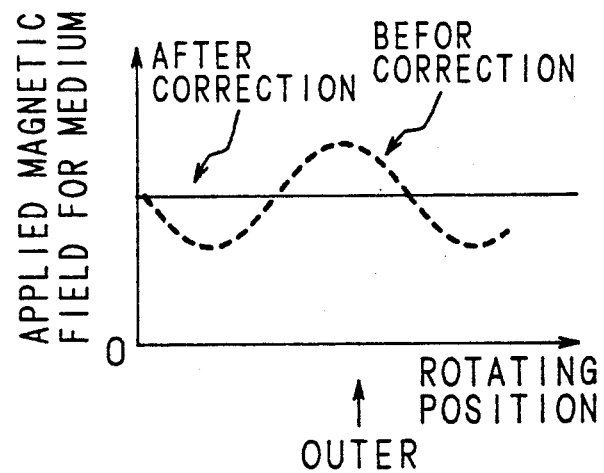
Figure 7D:
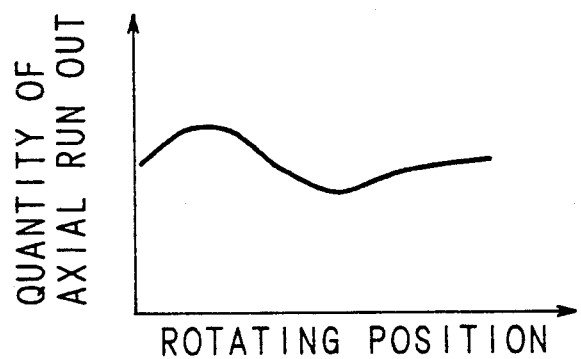
Figure 7E:
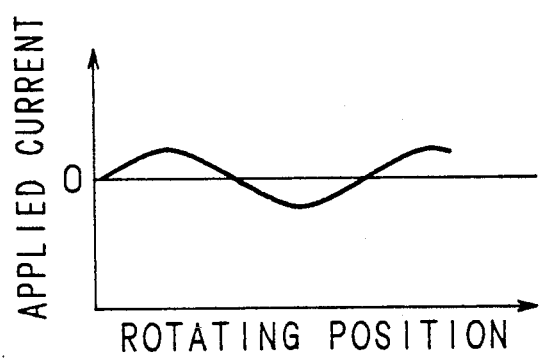
Figure 7F:
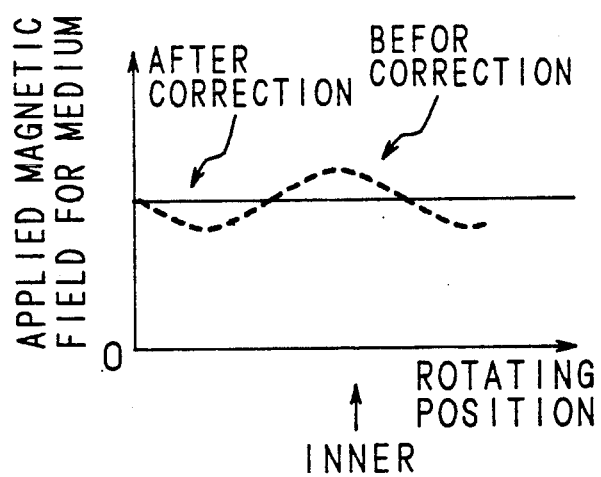

At a startup time of the apparatus, first the axial run out signals S1 are detected on outer and inner tracks of the magneto-optic recording information medium 11, for example, on the outermost track and on the innermost track as shown in FIG. 7(a) and FIG. 7(d), and the signals S1 along with the position information signals S3 are stored in the memory 51. When recording information on each track by the optical head 22, currents to be applied to the auxiliary magnet 21 are controlled by the driver 53 in response to the axial run out signal S1 stored in the memory 51 as shown in FIG. 7(b) and FIG. 7(e). Thus, the magnetic field practically applied to the magneto-optic recording information medium 11 becomes uniform as shown by a solid line in FIG. 7(c) and (f). In addition, states of the magnetic field not undergone during the above processing are shown by a broken line in FIG. 7(c) and FIG. 7(f).

Further, as to each track between the outermost and the innermost tracks, it is reasonable to adjust the magnetic field with interpolation based on both data of the uttermost tracks.

Still further, it is possible to control the magnetic field with higher accuracy by sampling data on some points between the uttermost tracks at a startup time of the apparatus and interpolating with these data.

Figure 8A:
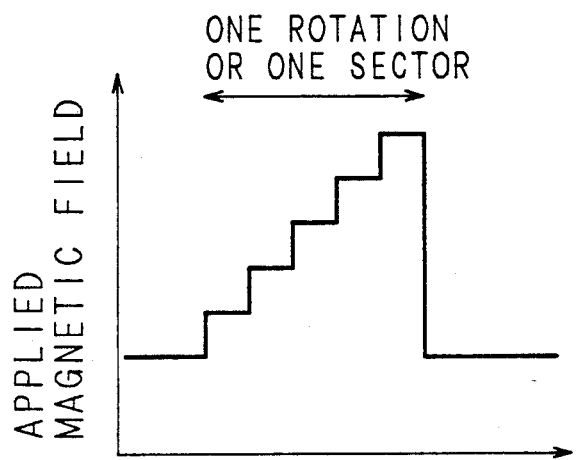
FIG. 8(a) and FIG. 8(b) are graphs showing recorded signals and reproduced signals for explaining other embodiments.

FIG. 8 is a graph showing a relation between magnetic fields applied to the magneto-optic recording information medium 11 by the magnetic field generator 18 and the auxiliary magnet 21 and amplitudes of reproduced signals in order to explain another control technique of the magneto-optic recording apparatus of the invention.

Figure 8B:
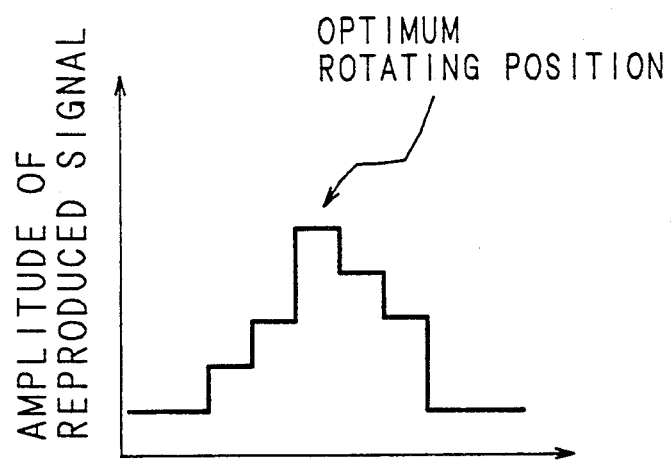

In this technique a test pattern is recorded on a predetermined test track by varying the intensity of the magnetic field of the auxiliary magnet 21 at a startup time of the apparatus. Reproduced signals are obtained from this test track and the applied intensity of magnetic field of the auxiliary magnet 21 corresponding to the optimum reproduced signal among the reproduced signals is practically used for recording information as shown in FIG. 8(b).

Another embodiment of the invention is next explained.

Figure 9:
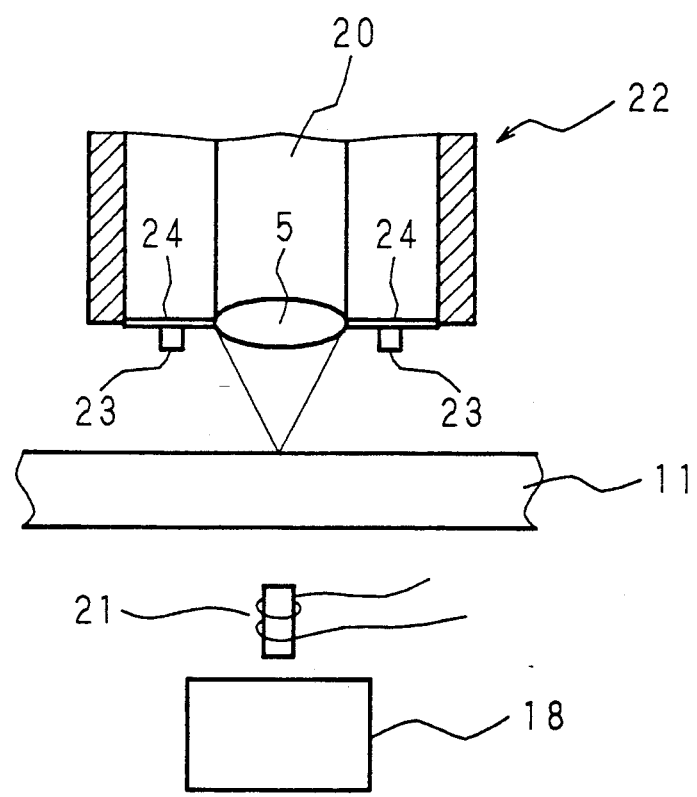
FIG. 9 is a longitudinal section view showing an essential part of the magneto-optic recording apparatus of the invention for explaining still further embodiment.

FIG. 9 is a vertical sectional view showing an essential part of FIG. 5, that is, the part including the optical head 22, magneto-optic recording information medium 11, auxiliary magnet 21 and the magnetic field generator 18.

In FIG. 9, numeral 24 denotes a support member which supports the objective lens 50 to the optical head 22. On an opposite side of the support member 24 to the magneto-optic recording information medium 11, magnetic field sensors 23 are provided. The magnetic field sensor 23 is provided for detecting a magnetic field generated by the magnetic field generator 18 and the auxiliary magnet 21. The intensity of the magnetic field generated by the magnetic field generator 18 is constant but the intensity of magnetic field generated by the auxiliary magnet 21 is controllable. That is, the intensity of the magnetic field applied to the magneto-optic recording information medium 11 can be controlled to be constant, regardless of the axial run out, by feeding back data detected by the magnetic field sensor 23 to the auxiliary magnet 21.

Figure 10:
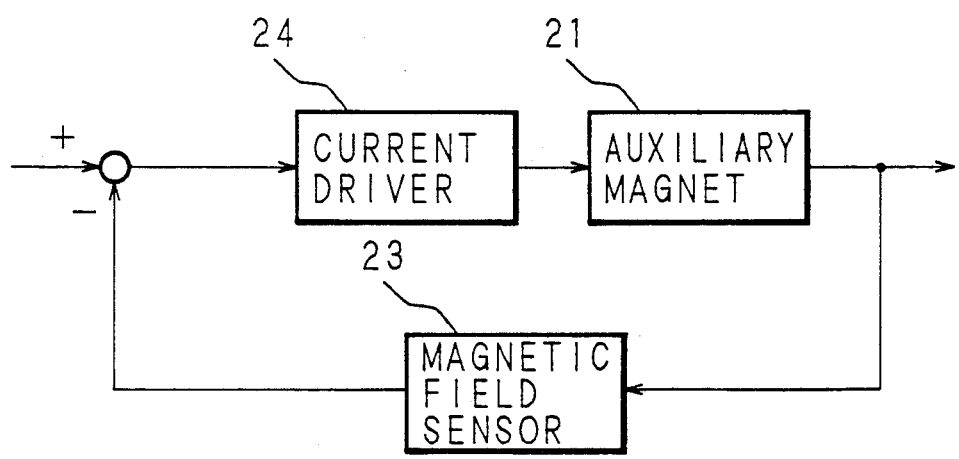
FIG. 10 is a schematic circuit diagram showing a control circuit used for the apparatus of FIG. 9, FIG. 11 and FIG. 12 are schematic views showing practical examples of the apparatus of FIG. 9.

FIG. 10 is a block diagram showing one example of a configuration of a control circuit applicable to the configuration shown in FIG. 9. In this figure, numerals 21 and 23 denote the above auxiliary magnet and the magnetic field sensor, 24 a current driver which actuates the auxiliary magnet 21, that is, which supplies current for exciting the auxiliary magnet 21. Data detected by the magnetic field sensor 23 is fed back to the current driver 24 to control current applied to the auxiliary magnet 21.

By using this circuit configuration, the intensity of the magnetic field applied to the magneto-optic recording information medium 11 is suitably controlled and kept constant even when the axial run out exists.

Figure 11:
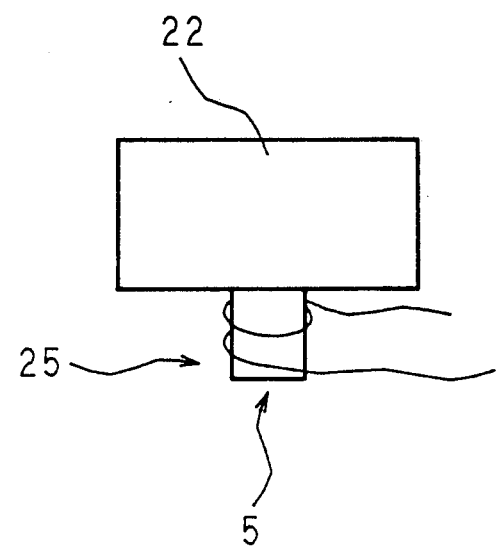

FIG. 11 is a schematic diagram showing a configuration provided with a coil 25 as the magnetic field sensor 23 on a circumference of the objective lens 5 of the optical head 22.

Figure 12:
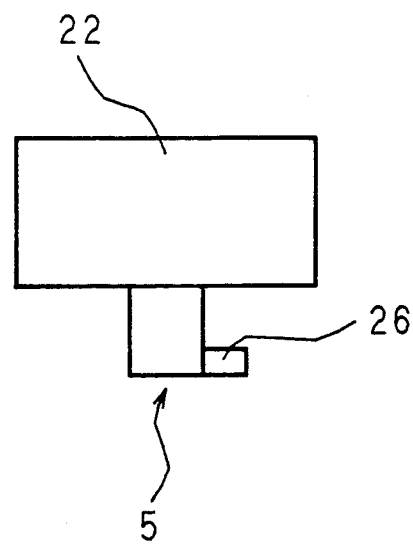

FIG. 12 is a schematic diagram showing a system equipped with a Hall element 26 on a side of the objective lens 5.

Figure 13:
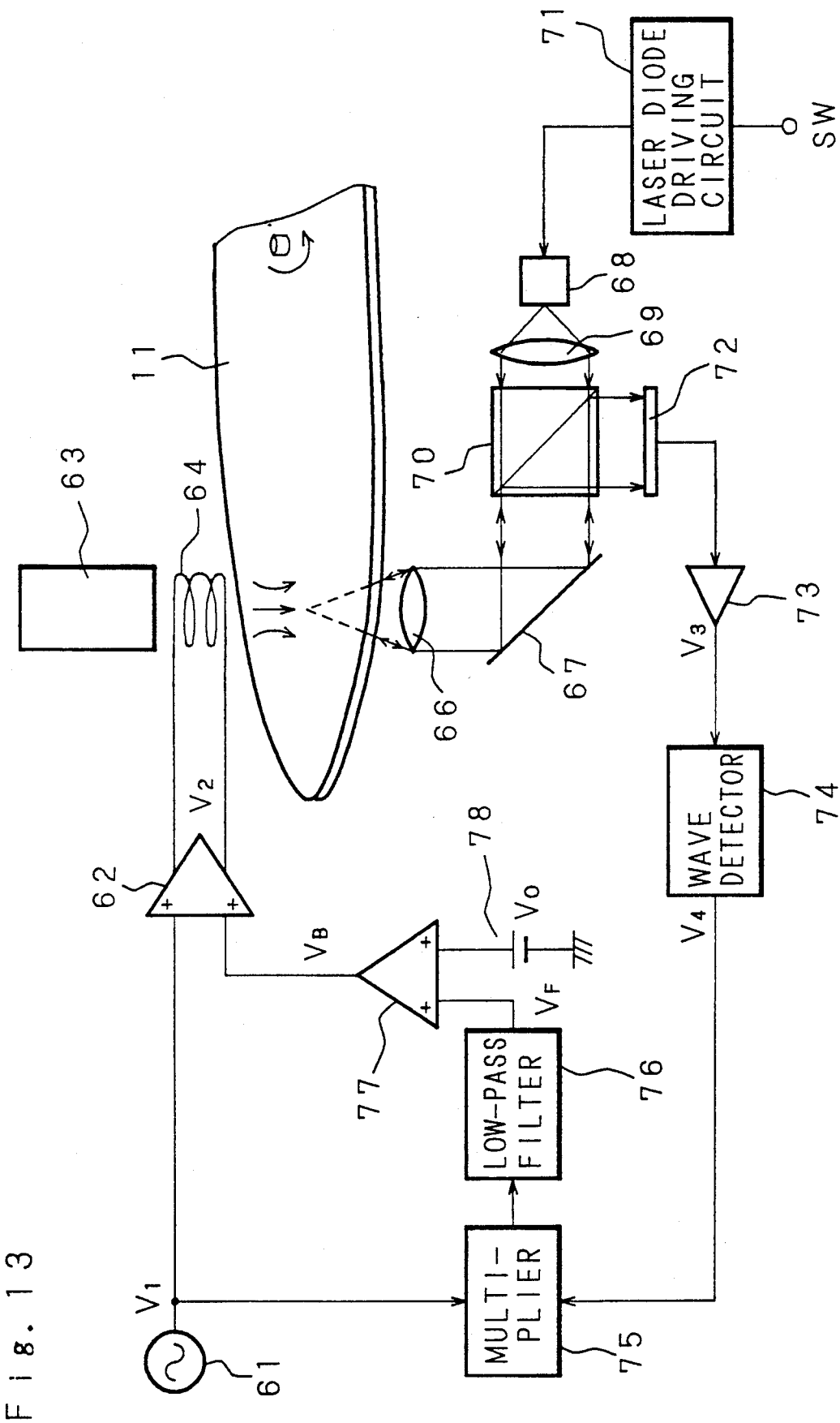
FIG. 13 is a schematic diagram showing a configuration of the second invention of the magneto-optic recording apparatus of the present invention.

FIG. 13 is a schematic diagram showing a configuration of the magneto-optic recording apparatus of the second invention.

An output of an oscillator 61 which generates an A.C. voltage $V_1$ is inputted to each one input terminal of a multiplier 75 and a first adding amplifier 62. An oscillating frequency of the oscillator 61 is lower than a frequency of a recorded signal but higher than a frequency of magnetic field nonuniform sensitivity of the magneto-optic recording information medium 11. For example, the oscillating frequency of the oscillator 61 is selected within a range of 500 Hz to 500 KHz.

An output voltage $V_2$ of the adding amplifier 62 is given to an exciting coil 64 whose axis is aligned with a magnetic axis of a permanent magnet 63 and which is positioned on a side of the magneto-optic recording information medium 11 and which has a necessary number of turns. Magnetic field generated by the permanent magnet 63 and magnetic field generated by the exciting coil 64 are added with each other and applied to the magneto-optic recording information medium 11. A magnetic pole of the permanent magnet 63 is positioned on one side of the magneto-optic recording information medium 1 and on the other side of it, a condenser lens 66 and a mirror 67 are positioned in a place opposite to the exciting coil 64. An emitting light of a laser diode 68 passes through a lens 69 and a beam splitter 70 and there, is reflected by the mirror 67 and is projected on the magneto-optic recording information medium 11 through the condenser lens 66.

Further, the laser diode 68 is driven by an output of a laser diode driving circuit 71 to which recorded signals SW are inputted. A reflected light from the magneto-optic recording information medium 11 is projected on a photo detector 72 through the condenser lens 66, mirror 67 and the beam splitter 70. An output of the photo detector 72 is inputted to a photoelectric transducer amplifier 73, whose output voltage $V_3$ is inputted to a wave detector 74. An output voltage $V_4$ of the wave detector 74 is inputted to the multiplier 75, whose output voltage is inputted to one input terminal of a second adding amplifier 77 through a low-pass filter 76. A reference voltage $V_0$ of a reference power source 78 is given to the other input terminal of the second adding amplifier 77. An output voltage of the adding amplifier 77, that is, a bias voltage $V_B$ is inputted to the other input terminal of the adding amplifier 62. The wave detector 74, multiplier 75 and the low-pass filter 76 configure a synchronous wave detecting circuit.

Figure 1A:
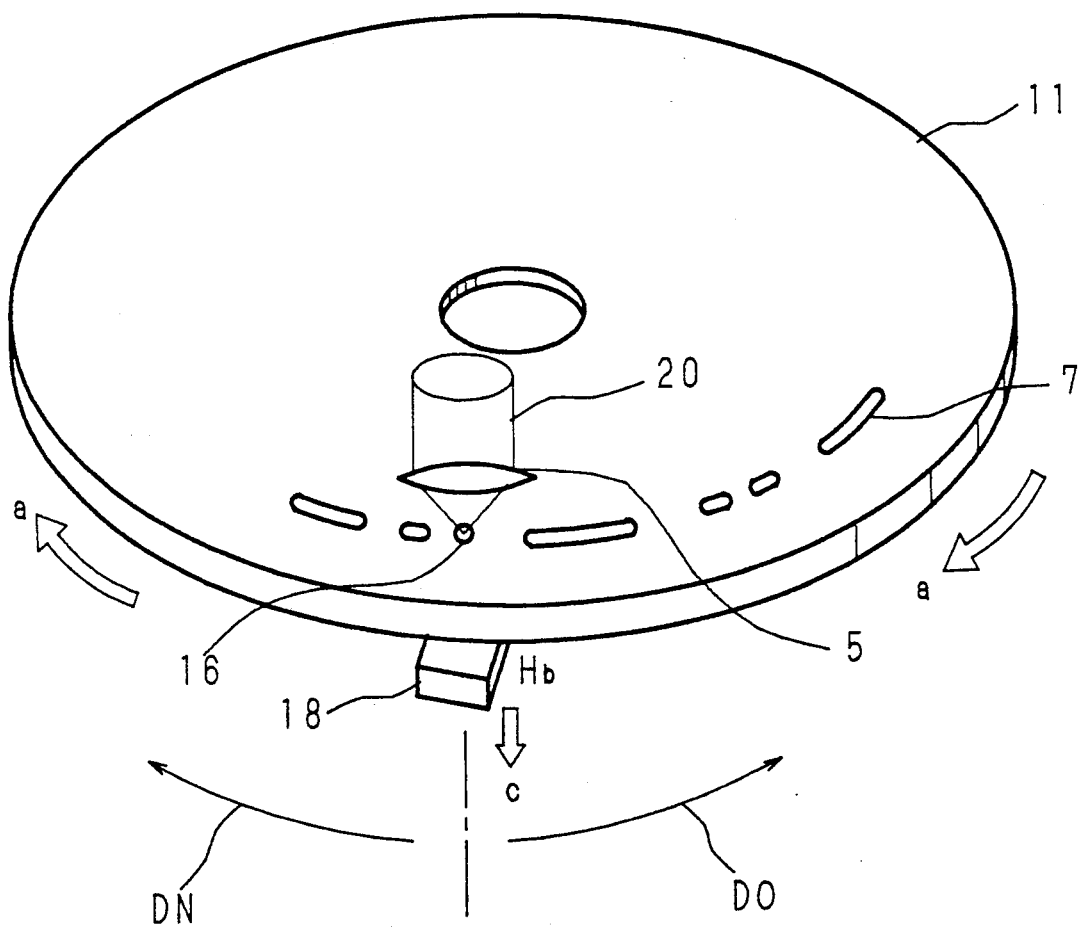
FIG. 1(a) is a schematic diagram showing an essential part of a magneto optic recording information medium and a magneto-optic recording apparatus for reading information therefrom according to the invention.
Figure 1B:
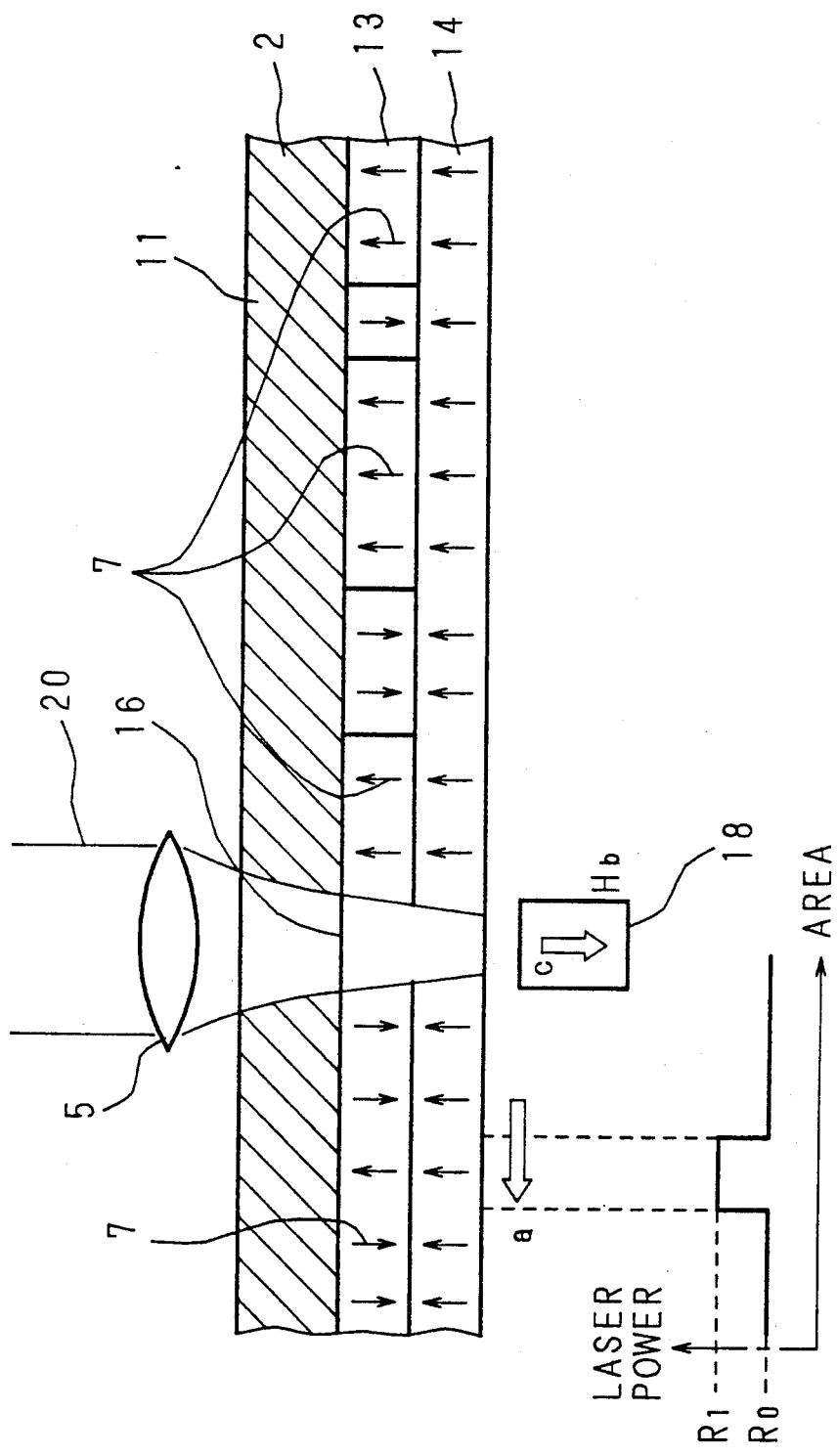
FIG. 1(b) is a partial sectional view of the magneto-optic recording information medium taking along its circumference and includes a graph showing a variation of a laser beam power for recording information on the magneto-optic recording information medium.
Figure 2:
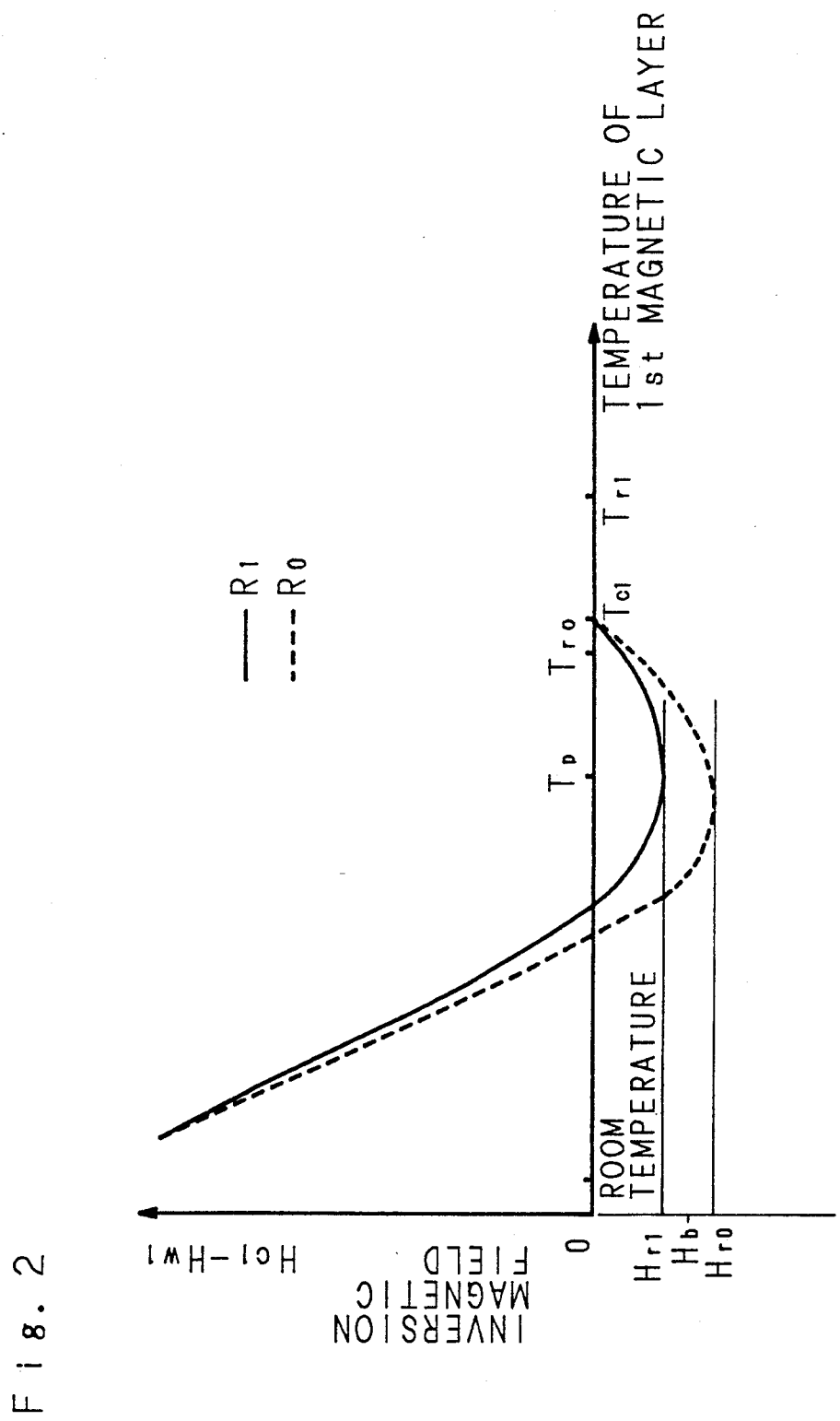
FIG. 2 is a graph showing a variation of temperatures of inversion magnetic fields of a first magnetic layer of the magneto-optic recording information medium of the invention.
Figure 3:
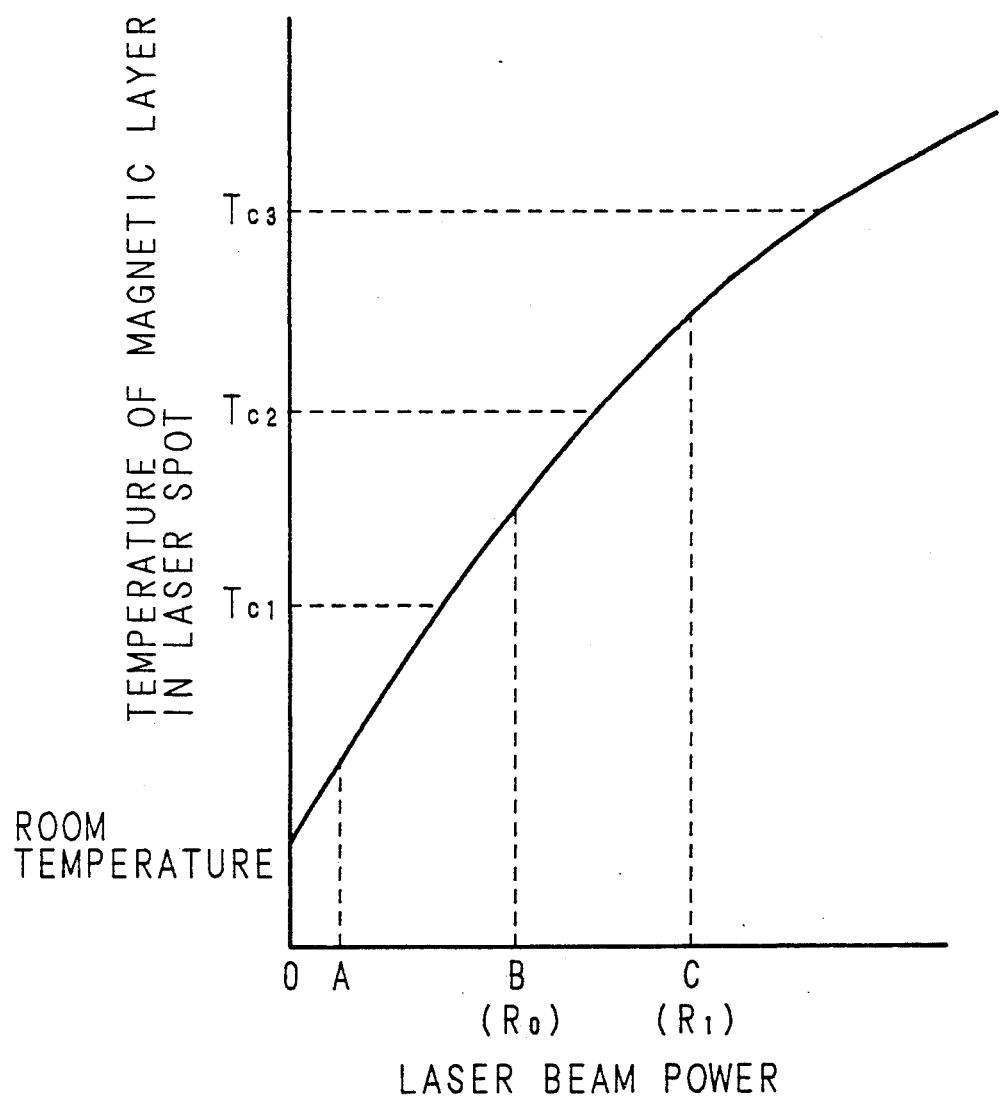
FIG. 3 is a graph showing a relation between the intensity of laser beam projected on the magneto-optic recording information medium and the temperatures of the magnetic layer in the laser beam spot.
Figure 4:
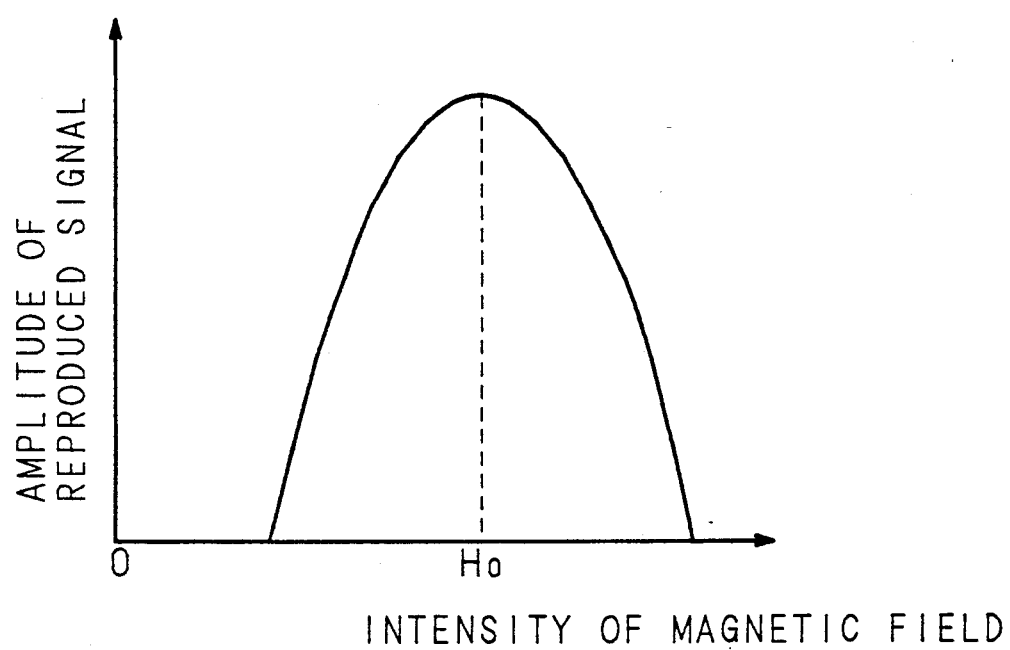
FIG. 4 is a graph showing a relation between intensities of magnetic field applied to the magneto-optic recording information medium and amplitudes of reproduced signals in the conventional magneto-optic recording apparatus.
Figure 14:
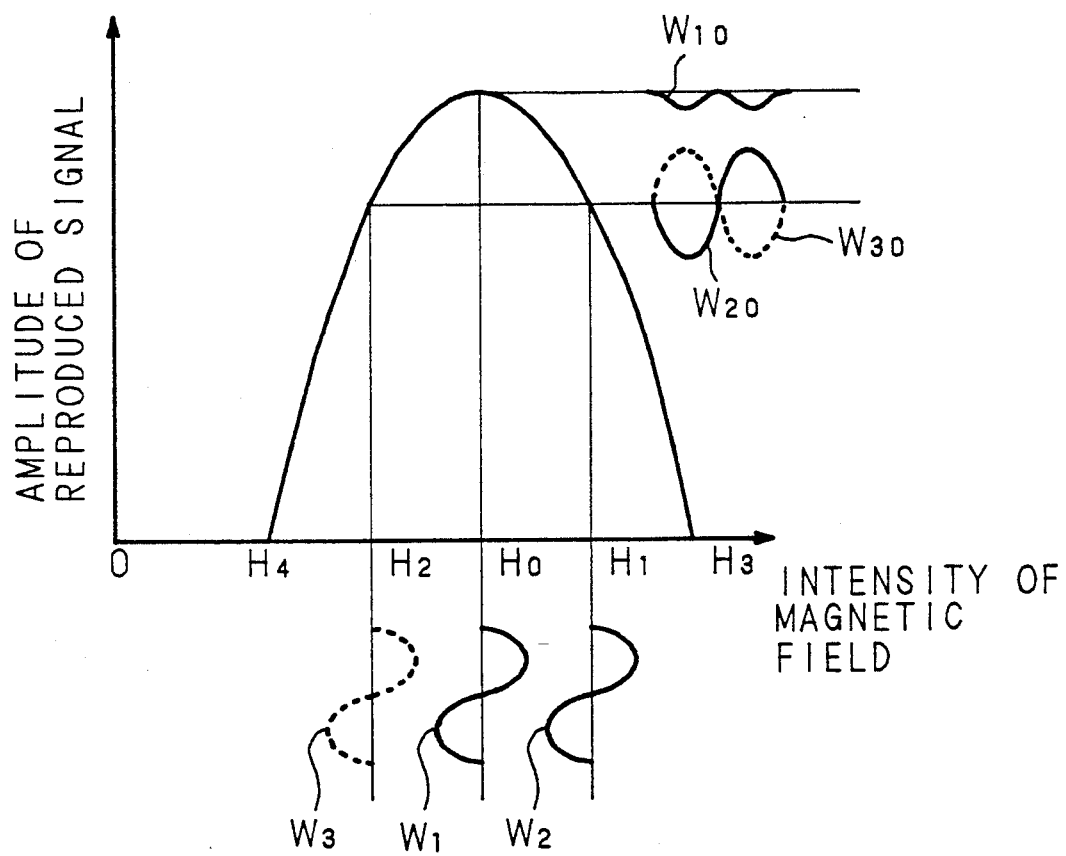
FIG. 14 is a graph showing a relation between waveforms of A.C. voltage applied to an exciting coil of a magnetic field generator and reproduced signals.

FIG. 14 is an illustrative view showing a relation between A.C. voltage waveforms applied to the exciting coil 64 and their reproduced signal waveforms based on the relation of intensities of magnetic field with respect to amplitudes of reproduced signals shown in FIG. 4.

As can be seen from this figure, when intensity of a magnetic field generated by the permanent magnet 63 and the exciting coil 64 is the optimum value $H_0$, the A.C. voltage waveform $W_1$ applied to the exciting coil 64 is transformed into a reproduced signal waveform $W_{10}$, which has a small amplitude and a double frequency. When the intensity of the magnetic field is higher (lower) than the optimum $H_0$, that is, $H_1$, ($H_2$), an A.C. voltage waveform $W_2$ ($W_3$) having the same phase as the $W_1$ is transformed into a reproduced signal waveform $W_{20}$ ($W_{30}$), which has an opposite phase to (the same phase as) that of the A.C. voltage waveform $W_2$ ($W_3$) and a somewhat large amplitude. Thus, determination can be made as to whether the intensity of the magnetic field applied to the magneto-optic recording information medium 11 is optimum or not.

Then, operations of the magneto-optic recording apparatus thus configurated will be explained referring to FIG. 15(A) through FIG. 15(E) showing signal waveforms at some points of the circuit.

Figure 15:
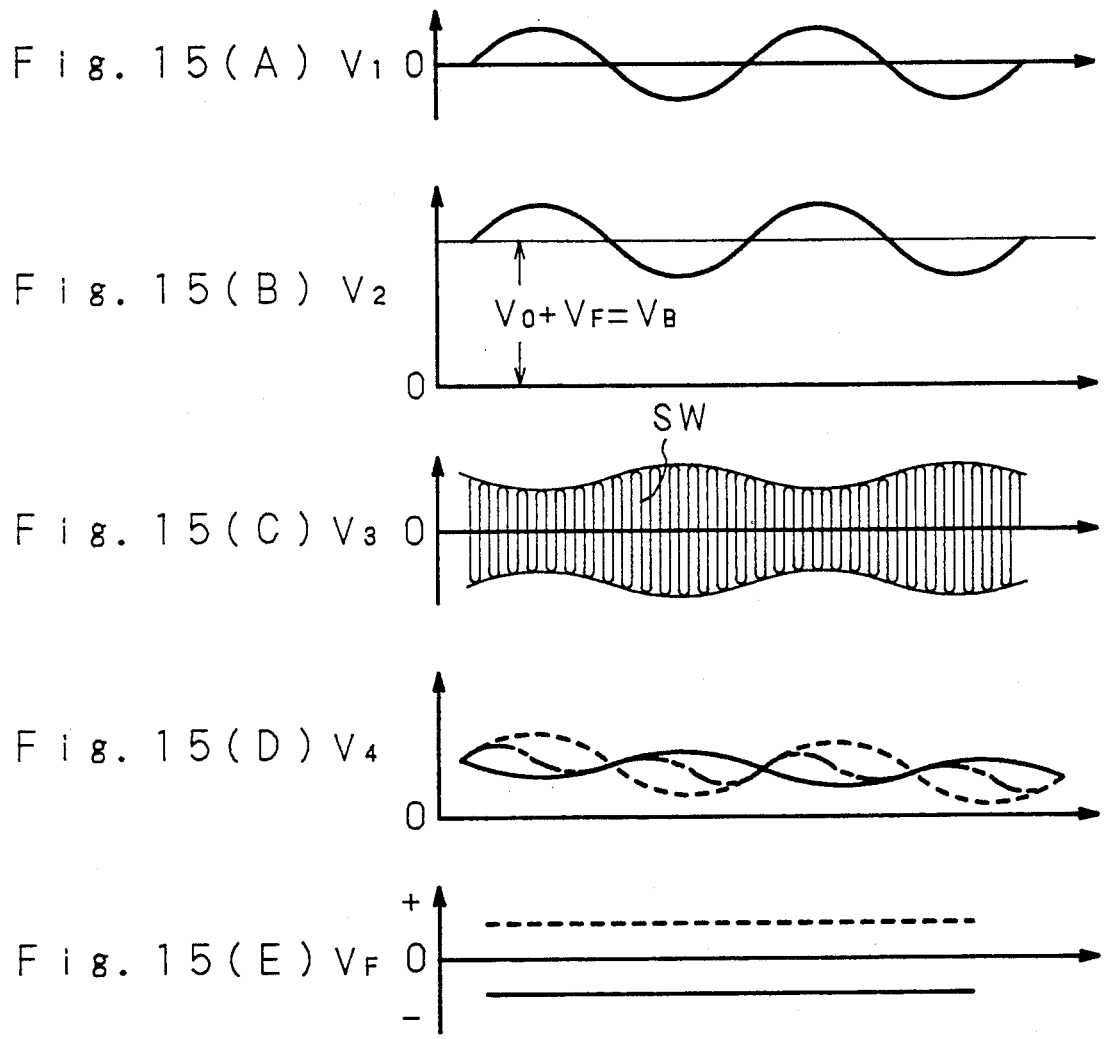
FIG. 15(A) through FIG. 15(E) are graphs showing signal waveforms for explaining operations of the magneto-optic recording apparatus with the system of FIG. 13 according to the invention.

When operating the oscillator 61, oscillating output voltage $V_1$ by the oscillator 61 forms a sine wave shown in FIG. 15(A). This A.C. voltage $V_1$ is given to the adding amplifier 62, to which the bias voltage $V_B$ is also given. The bias voltage $V_B$ is an output voltage of the adding amplifier 77 which adds an output voltage $V_F$ of the low-pass filter 76 and the reference voltage $V_0$ of the reference power source 78. The output voltage $V_2$ of the adding amplifier 62 is shown in FIG. 15(B). That is, the A.C. voltage $V_1$ as the oscillating output alternates with respect to a reference level of the bias voltage $V_B$. The output voltage $V_2$ of the adding amplifier 62 is applied to the exciting coil 64, which generates a magnetic field corresponding to the voltage $V_2$, and adds this magnetic field, as a bias, to the magnetic field generated by the permanent magnet 63.

Now, when an intensity of a magnetic field generated by the permanent magnet 63 and the exciting coil 64 is set to the intensity $H_1$ larger than the optimum value $H_0$ and information is recorded with emitted light by the laser diode 68 in response to the recorded signal SW, the photo detector 72 received the reflected light from the magneto-optic recording information medium 11 and transduces it into an electric signal and then passes the signal to the photoelectric transducer-amplifier 73. The output voltage $V_3$ of the amplifier 73 is transformed into an amplitude-modulated wave modulated with the A.C. voltage $V_1$ as shown in FIG. 15(C). The waveform shown within envelopes indicates the recorded signal SW.

As shown with a solid line in FIG. 15(D), an output voltage $V_4$ of the wave detector 74 obtained by wave-detecting the output voltage $V_3$ transformed into a waveform having an opposite phase to that of the A.C. voltage $V_1$ shown in FIG. 15(A). That is, as can be seen from the description of FIG. 14, the intensity $H_1$ of the magnetic field larger than the optimum $H_0$ is detected. The output voltage $V_4$ and the output voltage $V_1$ as an oscillating output are multiplied by the multiplier 75. Output voltage as the multiplied result by the multiplier 75 is passed through the low-pass filter 76 to become an output voltage $V_F$. The output voltage $V_F$ becomes a negative voltage as shown with a solid line in FIG. 15(E). This voltage $V_F$ is inputted to the adding amplifier 77 to reduce this bias voltage $V_B$ that is an output of the adding amplifier 77, thereby the output voltage $V_2$ of the adding amplifier 62 is reduced, thus reducing intensity of the bias magnetic field generated by the exciting coil 64. That is the intensity of the magnetic field to be applied to the magneto-optic recording information medium 11 is reduced.

Further, when intensity of the magnetic field applied to the medium 11 is low, the circuitry operates in the same way as the abovementioned. The output voltage $V_4$ of the wave detector 74 is shown with a broken line as illustrated in FIG. 15(D) and the output voltage $V_F$ of the low-pass filter 76 becomes a positive voltage as shown with a broken line in FIG. 15(E) and the bias voltage $V_B$ goes high to increase intensity of the bias magnetic field generated by the exciting coil 64.

Still further, when the intensity of the magnetic field applied to the magneto-optic recording information medium 11 is optimum, the output voltage $V_4$ of the wave detector 74, shown with a dashed line as illustrated in FIG. 15(D), has a small amplitude and a double frequency. The output voltage $V_F$ of the low-pass filter 76 becomes zero.

Thus, when performing synchronous wave detection of the signals obtained from the photoelectric transduction of the reflected light from the magneto-optic recording information medium 11 by using the A.C. voltage generated by the oscillator 61, and configuring the feedback loop to give the voltage corresponding to the synchronous wave detection output to the exciting coil 64, the intensity of the bias magnetic field generated by the exciting coil 64 can be so controlled that it always takes the optimum value $H_0$. Thereby the magneto-optic recording information medium 11 is applied with a magnetic field responding to its magnetic field sensitivity and records information corresponding to the recorded signals SW.

Therefore, levels of signals reproduced from the recorded information medium 11 become constant and accuracy of reproduction can be improved.

In this embodiment, the bias magnetic field is added to the magnetic field of the permanent magnet 63, but the intensity of the magnetic field generated by the exciting coil 64 can be heightened by increasing the reference voltage $V_0$ of the reference power source 78. In this case, it is possible to generate a magnetic field with a necessary intensity to the magneto-optic recording information medium 11 by using only exciting coil 64.

Further, it is needless to say that by using the permanent magnet 63 together with the exciting coil 64, it is possible to reduce power for the exciting coil 64 and miniaturize the coil 64.

Now, each of the above embodiments of the invention is explained for the magneto-optic recording information medium 11 having two magnetic layers, and this is for simplification of explanation, but each of the above inventions can also be applied to a medium 11 having three or more magnetic layers. A magneto-optic recording information medium 11 having four magnetic layers shown in FIG. 16 will be explained as one example.

This medium 11 is formed with lamination of a dielectric layer 81 made on, for example, a glass substrate 2 by the sputtering method for example, a first magnetic layer 13 as a recording layer, a second magnetic layer 14 as an auxiliary layer for recording, a third magnetic layer 83 as a control layer, a fourth magnetic layer 84 as an initialization layer, and a protective layer 82 in order.

Material and thickness of each layer are as follows:

| | | |
|---|---|---|
| dielectric layer (81) | $SiN_x$ | 65 nm |
| 1st magnetic layer (13) | $Tb_{22}Fe_{69}Co_9$ | 80 nm |
| 2nd magnetic layer (14) | $Gd_8Dy_{17}Fe_{60}Co_{15}$ | 150 nm |
| 3rd magnetic layer (83) | $Tb_{30}Fe_{84}$ | 20 nm |
| 4th magnetic layer (84) | $Tb_{30}Co_{70}$ | 40 nm |
| protective layer (82) | $SiN_x$ | 70 nm |

Characteristics of these magnetic layers 13, 14, 83, 84 are as follows:

Each adjacent magnetic layers are bonded with exchange force.

The first magnetic layer 13 effects is used for information recording and holding.

The second magnetic layer 14, the third magnetic layer 83, and the fourth magnetic layer 84 are not effect used as information media and they are added to enable light modulation direct overwriting. The fourth magnetic layer 84 is an initialization layer which does not cause flux reversal of sublattice against temperature rise with laser beam projection within the range of operation and have an effect of opposing a bias magnetic field generated by the magnetic field generator 18.

The third magnetic layer 83 is a control layer which cuts off exchange force coming from the fourth magnetic layer 84 at high temperatures.

Denoting Curie temperature of i-th magnetic layer with Tci; half magnetic field width of an inversion magnetic field (corresponds to coercive force) in the i-th magnetic layer with Hci; exchange force which the i-th magnetic layer receives from adjacent magnetic layers with Hwi, the magnetic characteristics of the magnetic layers 13, 14, 83 and 84 are as following inequalities (a) through e(g):

In addition, the exchange force is a transition width of the i-th magnetic layer and as to the second magnetic layer 14 and the third magnetic layer 83, it is defined for flux reversal as shown in FIG. 17.

| | | | |
|---|---|---|---|
| $T_{c4} > (T_{comp4}) > T_{c2} > T_{c1} > (T_{comp2})$ | | | (a) |
| | | $> T_{c3} >$ room temperature | |
| 1st magnetic layer | $H_{w1} < H_{c1}$; | to room temperature | (b) |
| | $H_{w1} > H_{c1}$; | to $T_{c1}$ | (c) |
| 2nd magnetic layer | $H_{w2} > H_{c2}$; | to $T_{c3}$ | (d) |
| | $H_{w2} < H_{c2}$; | to $T_{c1}$ | (e) |
| 3rd magnetic layer | $H_{w3} > H_{c3}$; | to $T_{c3}$ | (f) |
| 4th magnetic layer | $H_{w4} < H_{c4}$; | within the range of operating temperature | (g) |

The inequality (b) shows that magnetization of the first magnetic layer 13 does not reverse regardless of flux reversal of the second magnetic layer 14 at room temperatures, (d), (f), and (g) show that direction of magnetizations of the second magnetic layer 14, third magnetic layer 83 and fourth magnetic layer 84 are all downward (direction of the protective layer 82) at room temperatures after recording.

When the information recording methods for the magneto-optic recording information medium 11 according to the invention is effected using this medium having four magnetic layers, the unerased portion is perfectly eliminated and the system enables stable recording and reproducing as compared with the fact that when the medium having two magnetic layers is used, the unerased portion caused by beam spot displacement and beam intensity (laser power) fluctuation may greatly impair the reproduced signals.

As mentioned above in detail, according to the first embodiment of the magneto-optic recording apparatus of the invention, it becomes possible to instantaneously correct the magnetic field to be applied to the magneto-optic recording information medium and to keep its intensity constant in response to the relative distance between the magnetic field generator and the magneto-optic recording information medium by using the auxiliary magnetic field generator. This enables more stabilized and accurate information recording on the magneto-optic recording information medium as compared with the convention apparatus and also improves quality of reproduced signals.

In the second embodiment of the invention, the intensity of the magnetic field that optimizes amplitude of the reproduced signal can be obtained, thus improving accuracy of information reproducing and high reliable magneto-optic recording apparatus can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magneto-optic recording apparatus comprising:
    a magneto-optic recording information medium having a plurality of laminated magnetic layers with vertical magnetic anisotropy, one layer among which keeps its direction of magnetization constant and does not cause flux reversal at recording and reproducing;
    an optical head which projects a light beam onto said magneto-optic recording information medium for recording information thereon;
    a magnetic field generator which applies a first magnetic field to a portion, onto which said light beam is projected from said optical head, of the magneto-optical recording information medium;
    an auxiliary magnetic field generator for generating an auxiliary magnetic field which is applied to said portion of the magneto-optic recording information medium; and
    control means for varying the intensity of the auxiliary magnetic field generated by said auxiliary magnetic field generator so as to maintain a combination of the first magnetic field and the auxiliary magnetic field at said portion substantially constant in order to compensate for variations of the intensity of the combination at said portion due to axial run out.

2. A magneto-optic recording apparatus as set forth in claim 1, wherein said control means is provided with a detecting means for detecting a distance between said magneto-optic recording information medium and said magnetic field generator and varies the intensity of the auxiliary magnetic field generated by said auxiliary magnetic field generator in response to the distance detected by said detecting means.

3. A magneto-optic recording apparatus as set forth in claim 1, wherein
    said magneto-optic recording information medium has a test track thereon, and
    said control means causes said optical head to record information onto said test track while varying the intensity of the magnetic field generated by said auxiliary magnetic field generator and thereafter reproduces information from said test track and controls the intensity of the magnetic field generated by said auxiliary magnetic field generator in response to the reproduced information so as to obtain an optimum reproduced signal.

4. A magneto-optic recording apparatus comprising:
    a magneto-optic recording information medium having a plurality of laminated magnetic layers with vertical magnetic anisotropy, one layer among which keeps its direction of magnetization constant and does not cause flux reversal at recording and reproducing;
    an optical head which projects a light beam onto said magneto-optic recording information medium for recording information thereon;
    a magnetic field generator which applies a magnetic field to a portion, onto which said light beam is projected from said optical head, of the magneto-optical recording information medium;
    an auxiliary magnetic field generator which applies on auxiliary magnetic field to said portion of the magneto-optic recording information medium; and
    control means which varies the intensity of the auxiliary magnetic field generated by said auxiliary magnetic field generator in order to compensate for variations of intensity of the magnetic field generated by said magnetic field generator, wherein said optical head has a sensor for detecting the intensity of a magnetic field and said control means varies the intensity of the magnetic field generated by said auxiliary magnetic field generator in response to the detected result of said sensor.

5. A magneto-optic recording apparatus as set forth in claim 4, wherein said sensor is composed of a coil provided on said optical head.

6. A magneto-optic recording apparatus as set forth in claim 4, wherein said sensor is composed of a Hall element provided on said optical head.

7. The magneto-optic recording apparatus as set forth in claim 1, wherein said light beam is a laser beam.

8. A magneto-optic recording apparatus comprising:
a magneto-optic recording information medium having a plurality of laminated magnetic layers with vertical magnetic anisotropy, one layer among which keeps its direction of magnetization constant and does not cause flux reversal at recording and reproducing;
an optical head which projects a light beam onto said magneto-optic recording information medium for recording information thereon;
a magnetic field generator which applies a magnetic field to a portion, onto which said light beam is projected from said optical head, of the magneto-optical recording information medium;
an auxiliary magnetic field generator which applies an auxiliary magnetic field to said portion of the magneto-optic recording information medium; and
control means which varies the intensity of the auxiliary magnetic field generated by said auxiliary magnetic field generator in order to compensate for variations of intensity of the magnetic field generated by said magnetic field generator, wherein said magneto-optic recording information medium has four laminated magnetic layers.

9. A magneto-optic recording apparatus comprising:
a magneto-optic recording information medium having a plurality of laminated magnetic layers with vertical magnetic anisotropy, one layer among which keeps its direction of magnetization constant and does not cause flux reversal at recording and reproducing;
an optical head which projects a light beam onto said magneto-optic recording information medium for recording information thereon;
a magnetic field generator which applies a magnetic field to a portion, onto which said light beam is projected from said optical head, of the magneto-optical recording information medium;
an auxiliary magnetic field generator which applies an auxiliary magnetic field to said portion of the magneto-optic recording information medium; and
control means which varies the intensity of the auxiliary magnetic field generated by said auxiliary magnetic field generator in order to compensate for variations of intensity of the magnetic field generated by said magnetic field generator, wherein said magneto-optic recording information medium is formed of a lamination of

| dielectric layer | SiNx | 65 nm, |
| --- | --- | --- |
| magnetic layer | $Tb_{22}Fe_{69}Co_9$ | 80 nm, |
| magnetic layer | $Gd_8Dy_{17}Fe_{60}Co_{15}$ | 150 nm, |
| magnetic layer | $Tb_{30}Fe_{84}$ | 20 nm, |
| magnetic layer | $Tb_{30}Co_{70}$ | 40 nm, and |
| protective layer | SiNx | 70 nm | on a substrate in that order.

10. A magneto-optic recording apparatus comprising:
a magneto-optic recording information medium having a plurality of laminated magnetic layers with vertical magnetic anisotropy, one layer among which keeps its direction of magnetization constant and does not cause flux reversal at recording and reproducing;
an optical head which projects a light beam onto said magneto-optic recording information medium for recording information thereon and receives a reflected light beam from said magneto-optic recording information medium for reproducing information therefrom;
a magnetic field generator having an exciting coil for applying a magnetic field to a portion, onto which said light beam is projected from said optical head, of magneto-optic recording information medium;
an oscillator which applies an A.C. voltage to said exciting coil;
a photodetector which detects said reflected light from said medium and outputs signal;
a wave detecting circuit which performs synchronous wave detection of the signal outputted by said photodetector in response to the A.C. voltage outputted from said oscillator; and
control means for controlling the A.C. voltage to be applied to said exciting coil in response to output signal of said wave detecting circuit.

11. A magneto-optic recording apparatus as set forth in claim 10, wherein said light beam is a laser beam.

12. A magneto-optic recording apparatus as set forth in claim 10, wherein said magneto-optic recording information medium has four laminated magnetic layers.

13. A magneto-optic recording apparatus as set forth in claim 10, wherein said magneto-optic recording information medium is formed of a lamination of

| dielectric layer | SiNx | 65 nm, |
| --- | --- | --- |
| magnetic layer | $Tb_{22}Fe_{69}Co_9$ | 80 nm, |
| magnetic layer | $Gd_8Dy_{17}Fe_{60}Co_{15}$ | 150 nm, |
| magnetic layer | $Tb_{30}Fe_{84}$ | 20 nm, |
| magnetic layer | $Tb_{30}Co_{70}$ | 40 nm, and |
| protective layer | SiNx | 70 nm | on a substrate in that order.

* * * * *